United States Patent [19]

Barry et al.

[11] Patent Number: 5,640,482
[45] Date of Patent: Jun. 17, 1997

[54] FIBER OPTIC CABLE MANAGEMENT RACK

[75] Inventors: Bruce Eltringham Barry, Steelton; Matthew Jon Fasnacht, Mount Joy; Ronald Richard Schaffer, Harrisburg, all of Pa.

[73] Assignee: The Whitaker Corporation, Wilmington, Del.

[21] Appl. No.: 521,703

[22] Filed: Aug. 31, 1995

[51] Int. Cl.⁶ .................................................. G02B 6/00
[52] U.S. Cl. .......................... 385/135; 385/134; 385/136; 385/137
[58] Field of Search .................................. 385/134, 135, 385/136, 137, 138, 139, 147

[56] References Cited

U.S. PATENT DOCUMENTS

| | | | |
|---|---|---|---|
| 4,595,255 | 6/1986 | Bhatt et al. | 385/135 X |
| 4,697,874 | 10/1987 | Nozick | 385/135 X |
| 4,792,203 | 12/1988 | Nelson et al. | 385/135 X |
| 4,818,054 | 4/1989 | George et al. | 385/135 X |
| 4,962,989 | 10/1990 | Jung et al. | 385/135 X |
| 5,024,498 | 6/1991 | Becker et al. | 385/135 X |
| 5,052,773 | 10/1991 | Noon et al. | 385/136 |
| 5,071,211 | 12/1991 | Debortoli et al. | 385/76 |
| 5,093,885 | 3/1992 | Anton | 385/134 |
| 5,093,887 | 3/1992 | Witte | 385/135 |
| 5,100,221 | 3/1992 | Carney et al. | 385/135 |
| 5,127,082 | 6/1992 | Below et al. | 385/135 |
| 5,129,030 | 7/1992 | Petrunia | 385/135 |
| 5,146,532 | 9/1992 | Hodge | 385/136 |
| 5,204,929 | 4/1993 | Machall et al. | 385/135 |
| 5,241,617 | 8/1993 | Peacock et al. | 385/135 |
| 5,265,187 | 11/1993 | Morin et al. | 385/135 |
| 5,287,428 | 2/1994 | Shibata | 385/135 |
| 5,303,320 | 4/1994 | Duffie | 385/135 |
| 5,323,480 | 6/1994 | Mullaney et al. | 385/135 |
| 5,329,067 | 7/1994 | Abe et al. | 385/135 X |
| 5,335,349 | 8/1994 | Kutsch et al. | 385/135 |
| 5,337,400 | 8/1994 | Morin et al. | 385/135 |
| 5,339,379 | 8/1994 | Kutsch et al. | 385/135 |
| 5,363,465 | 11/1994 | Korkowski et al. | 385/135 |
| 5,402,515 | 3/1995 | Vidacovich et al. | 385/135 |
| 5,412,751 | 5/1995 | Siemon et al. | 385/135 |
| 5,421,532 | 6/1995 | Richter | 385/135 X |
| 5,430,823 | 7/1995 | Dupont et al. | 385/135 |
| 5,442,725 | 8/1995 | Peng | 385/135 |
| 5,448,675 | 9/1995 | Leone et al. | 385/135 |
| 5,458,019 | 10/1995 | Trevino | 385/135 |
| 5,546,495 | 8/1996 | Bruckner et al. | 385/135 |
| 5,559,922 | 9/1996 | Arnett | 385/135 |

OTHER PUBLICATIONS

*AMP Instruction Sheet 408-4077*, "Installation Instructions for AMP Fiber-Optic Central Splice Enclosures . . . ", Rev 0, six pages; issued Nov. 30, 1994; AMP Incorporated, Harrisburg, PA.
*ADC Catalog*, "Fiber Panel Accessories", p. 52, Apr. 1992; ADC Telecommunications, Minneapolis, MN.
*Hartwell Product Drawing No. HRN 6*, "1/4 Turn NYLATCH", May 11, 1982; The Hartwell Corporation, Placentia, California.

*Primary Examiner*—Brian Healy
*Attorney, Agent, or Firm*—Anton P. Ness

[57] ABSTRACT

A cable management rack (10) for supporting and routing pluralities of fiber optic cables (24) to and from optical interconnection sites of stacks of interconnection enclosures (22). First brackets (40) along end frame members (14) enable securing of the cables routed vertically, and also support removable rack cover panels (18). Second brackets (70,70A, 90) include arcuate cable support surfaces (72) for routing selected cables 90° (or 180°) about bends having radiuses great enough to protect the optical fibers of the cables. The second brackets (70,70A, 90) are removably affixable to the end frame members (14) or to intermediate frame members (16) at any location along a columnar array of fastening sites (34) beside the enclosure stacks, to correspond to any desired location of a cable bend, with the rack thus being modular. Relay brackets (110) provide for excess cable take-up.

17 Claims, 3 Drawing Sheets

FIBER OPTIC CABLE MANAGEMENT RACK

FIELD OF THE INVENTION

The present invention is related to fiber optic cables and more particularly to racks for cable routing management at interconnection sites.

BACKGROUND OF THE INVENTION

In premise wiring, pluralities of fiber optic cables are interconnected to others at interconnection sites where the connectors for individual optical fiber interconnection are provided in pluralities of enclosures in an optical interconnection bay of an office premises. Cables extending to the interconnection site from outside the office premises, and the cables extending from various locations within the premises, must be arranged for cable ends to extend to appropriate ones of the plurality of enclosures for interconnection to associated cables. Additionally, lengths of cables commonly are required to interconnect between enclosures at the site. All of the great plurality of cables must be routed in an orderly manner that permits easy installation and also in a manner that maintains the cables accessible for later servicing and repair. Further, the cables must be routed around bends in a manner preventing sharp bending of the cables and damaging the individual fragile optical fibers or undesirably attenuating the optical signals during transmission.

SUMMARY OF THE INVENTION

The present invention is a rack system adapted to route pluralities of fiber optic cables to selected ones of many enclosures having connectors for optical fiber interconnection. An open framework provides for holding enclosures of various types and sizes at known positions in columnar fashion, with narrow vertical end frame members defining ends of the framework and if used alone define an enclosure stack therebetween. Usually, one or more wider vertical intermediate frame members are positioned between and spaced from the end frame members to define openings for stacks of enclosures. The fiber optic cables are generally routed vertically along both types of frame members. Several types of brackets are provided all extending forwardly from a vertical frame member, preferably a common distance at least as far forwardly as ends of interconnection enclosures affixed to the framework.

Orthogonal brackets are regularly spaced vertically along at least the end frame members and affixed thereto, and enable conventional securing thereto of vertically oriented cable bundles such as by cable ties. The orthogonal brackets may further define at forwardmost ends thereof mounting flanges defining fastener sites providing for mounting of rack cover panels thereto upon completion of cable routing, in a manner permitting easy cover removal for cable servicing and repair. Optional relay brackets each form a continuous oval cable support surface and are fixedly mounted on intermediate ones of the vertical frame members between enclosure stacks, enabling take-up storage of lengths of cable looped therearound if desired, and also may further define at forwardmost ends thereof mounting flanges for enabling rack cover panel mounting.

Radius limiting brackets are mountable to, and removable from, end frame members and intermediate frame members at selected fastening sites to provide support for directing end portions of cables into a horizontal orientation for entry into associated enclosures for fiber interconnection. One type of radius limiting bracket includes an arcuate cable support surface extending for less than a quarter-turn for supporting a cable about a 90° turn, and preferably two variations are provided to permit radius limiting support for cables descending from above or for cables ascending from below to be directed to the left or to the right, as desired. A second type of radius limiting bracket may be provided having two arcuate cable support surfaces to provide for a 180° cable turn, such as for directing cables from one enclosure to another adjacent thereto, with the two support surfaces spaced to complement the distance between enclosure levels and may be joined therebetween by a planar surface tangential to the two arcuate support surfaces.

Columnar arrays of fastening sites are provided on the vertical frame members allowing for positioning of the radius limiting brackets essentially at any desired vertical location adjacent the enclosure columns, with one such fastening site array on each end frame member and two such arrays provided along side edges of each of the wider intermediate frame members outwardly of the relay brackets. The frame members may provide opposed spaced apart mounting surfaces enabling brackets to be mounted thereto for cable management along both mounting surfaces, where one thereof may be dedicated to cables from interior premise locations and the other to exterior premise locations.

It is an objective of the present invention to provide a system for securing and appropriately routing within an optical interconnection bay, end portions of fiber optic cables extending from the bay to other locations within an office premises or outwardly from the office premises.

It is another objective for the system to be modular to enable selectively positioning and routing the cables to interconnection enclosures.

It is a further objective for the system to facilitate access to the cables for servicing.

It is also an objective for the system to provide radius limiting brackets that are easily assembled to the framework at selected locations to program the rack as desired, and that are easily removed and relocated if desired.

An embodiment of the present invention will now be described by way of example with reference to the accompanying drawings.

DETAILED DESCRIPTION OF THE PREFERRED EMBODIMENT

Figure 1:
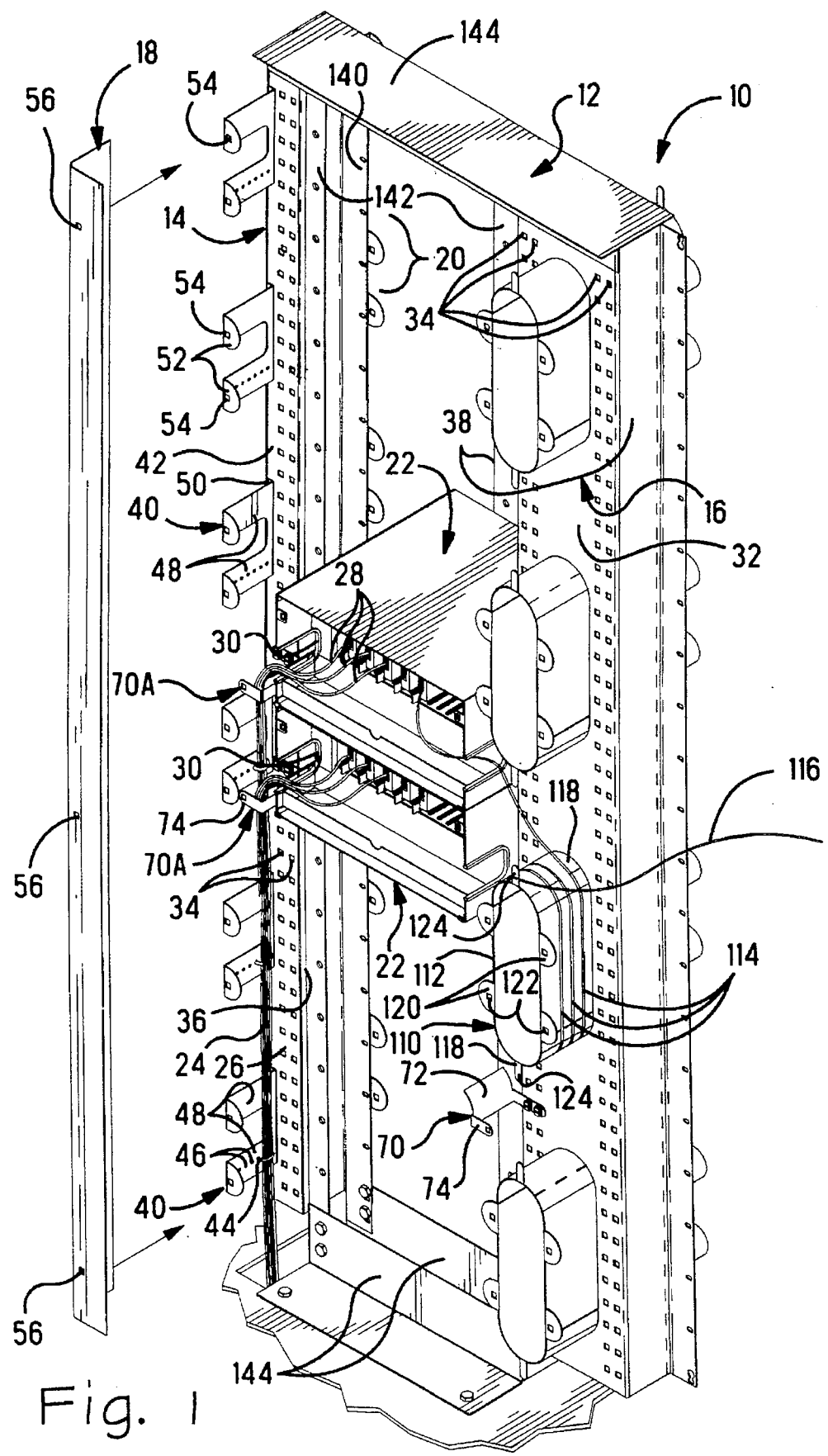
FIG. 1 is an isometric view of a cable management rack containing the present invention, with an end frame member and an intermediate frame member having therebetween two representative interconnection enclosures, and a pair of representative cable bundles secured to brackets of the end frame member and routed around respective radius limiting brackets, and with a representative rack cover panel exploded from the end frame member.

FIG. 1 illustrates the cable management rack 10 of the present invention. Framework 12 of the rack includes one of a pair of end frame members 14 and one of an indefinite number of intermediate frame members 16 utilized between the end frame members. A removable rack cover member 18 is shown exploded from end frame member 14 and is fastenable thereto upon routing and fastening of all cables to rack 10. Shown between end frame member 14 and intermediate frame member 16 is a vertical space defined by a pair of vertical rails 140,142 beside both frame members 14,16 and upper and lower horizontal crosspieces 144, comprising a conventional enclosure rack portion complying with Electronics Industry Association standards. The enclosure rack portion contains a plurality of enclosure sites 20 at which are mounted interconnection enclosures 22 to form an enclosure stack, with two such enclosures shown with their front panels removed.

Representative fiber optic cables 24 are shown extending upwardly from an opening through the flooring and ascending along end frame member 14 forwardly of mounting surface 26 thereof. End portions 28 of cables 24 extend through cable exits 30 of enclosures 22, for ends of optical fibers thereof to be interconnected to other associated fibers within the enclosures. Other cables may similarly be routed from above rack 10 to descend along end frame member 14 or along mounting surface 32 intermediate frame member 16 to be similarly routed to interconnection sites within enclosures such as enclosures 22. End frame member 14 includes a columnar array of fastening sites 34 adjacent the inner edge 36 thereof and thus proximate cable exits 30 of the enclosures 22 of the enclosure stack. Intermediate frame member 16 includes columnar arrays of fastening sites 34 adjacent both edges 38 thereof, also proximate cable exits of the enclosures.

Figure 3:
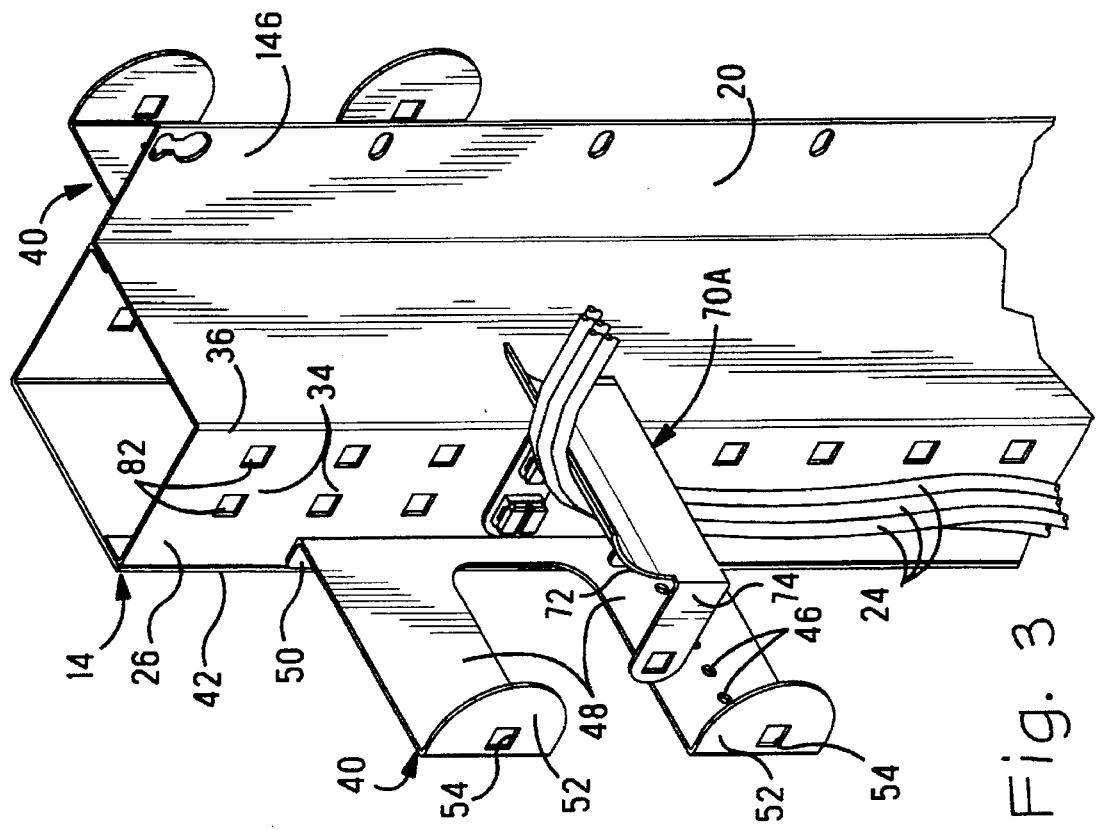
Figure 5:
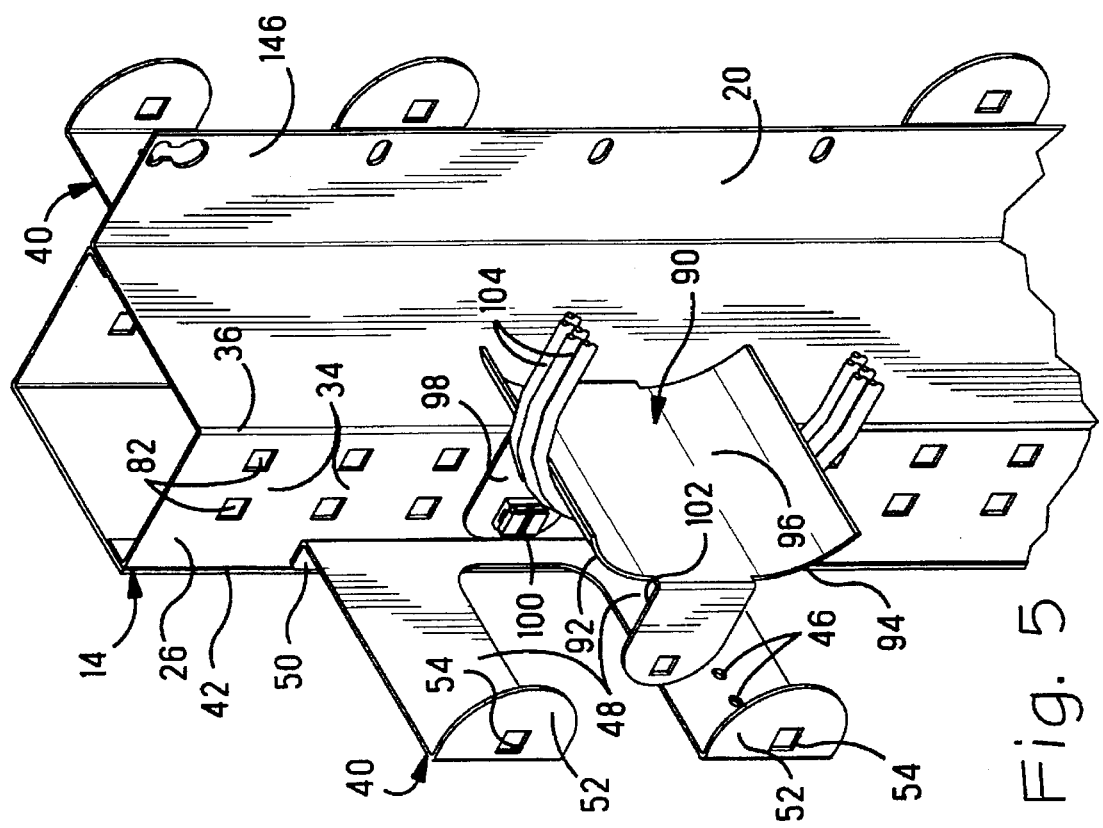

First or orthogonal brackets 40 are seen in FIGS. 1, 3 and 5 affixed to mounting surface 26 of end frame member 14 along outer edge 42 thereof at regularly spaced intervals, and cables 24 are seen to be secured to several thereof by conventional cable ties 44 secured to brackets 40 through apertures 46 through body sections 48 thereof joined to mounting sections 50 and extending orthogonally from mounting surface 26 of end frame member 14. At ends of body sections 48 are seen mounting flanges 52 extending parallel to frame mounting surface 26 and having apertures 54 therethrough, with apertures 54 cooperable with fasteners 56 preferably self-retainably secured to rack cover panel 18 enabling the rack cover panel to be mounted to the rack to enclose the routed cables. Mounting flanges 52 serve as cable retainer sections assuring the maintenance of the cables proximate the framework of rack 10 prior to securing the rack cover panels to the rack.

Second or radius limiter brackets 70,70A are seen mounted to end frame member 14 and to intermediate frame member 16. Each radius limiter bracket 70,70A includes an arcuate cable support surface 72 oriented perpendicular to the mounting surfaces 26,32 of frame members 14,16. Each arcuate cable support surface 72 has a selected radius large enough to protect an optical fiber extending about a bend of like radius, such that the fibers within a fiber optic cable 24 are protected as the cables are routed about the arcuate cable support surface to change direction such as from a vertical to a horizontal orientation, or a bend angle of 90°. Cable retainer sections 74 are also provided to assure the maintenance of the cables proximate the framework of rack 10 prior to securing the rack cover panels to the rack.

Figure 2:
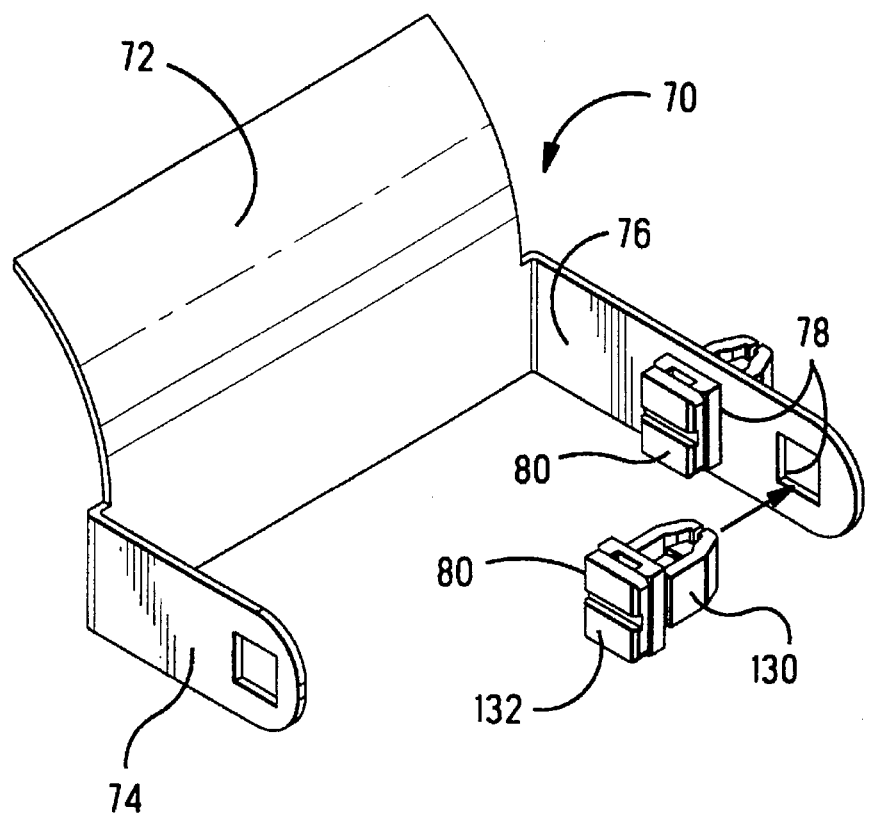
FIGS. 2 and 3 are isometric views of one type of radius limiter bracket and a rack portion illustrating its use with representative cables and also showing an orthogonal bracket all mounted to an end frame member.

Referring to FIG. 2, radius limiter bracket 70 includes a mounting section 76 oriented parallel to the mounting surfaces 26,32 of frame members 14,16. Mounting section 76 is seen to provide two fastener locations 78 comprising apertures, with fasteners 80 preferably self-retainably mounted thereat. It can be seen that the pair of fastener locations corresponds to the pair of corresponding fastener locations 82 of each fastening site 34 defined in the single columnar array on end frame member 14 and the two columnar arrays on intermediate frame member 16. Preferably radius limiter brackets are of a "left-handed" type and a "right-handed" type, with the left-handed type 70 being displayed in FIG. 2 and the right-handed type 70A in FIG. 3; the two types may be utilized as desired to direct descending cables to the left or right or to direct ascending cables (such as cables 24 in FIGS. 1 and 3) to the left or right. An appropriate bracket can be selected once it has been determined that the cables will either be descending or ascending along a particular columnar array of fastening sites, and the cables thus being associated with an enclosure stack to the left or to the right; the bracket should be positioned such that the leading edge of the arcuate cable support surface precedes the nearest portion of the enclosure's cable exit, with the cables continuing on a gentle arc beyond the support surface and into the cable exit and not urged against the leading edge.

With reference to FIG. 3, radius limiter bracket 70A is shown utilized to support fiber optic cables 24 about a bend of 90° while maintaining a desired minimum radius to the bend of the cables for protecting the optical fibers therewithin against damage or undesirable signal transmission attenuation from sharp bends. The arcuate cable support surface 72 may extend an arcuate distance of 90° or it may be somewhat less than that and still easily fulfill the desired purpose without protruding extensively in a horizontal direction, thus enabling a slight reduction in the horizontal dimension of the cable management rack 10 while allowing sufficient cable management access forwardly of mounting surfaces 26,32 of the frame members. Also seen is a flange 146 that enables fastening of frame member 14 to rail 140 of the enclosure rack portion of FIG. 1, while the enclosures would be fastened to rail 142 thereof using brackets of the enclosures (not shown).

Figure 4:
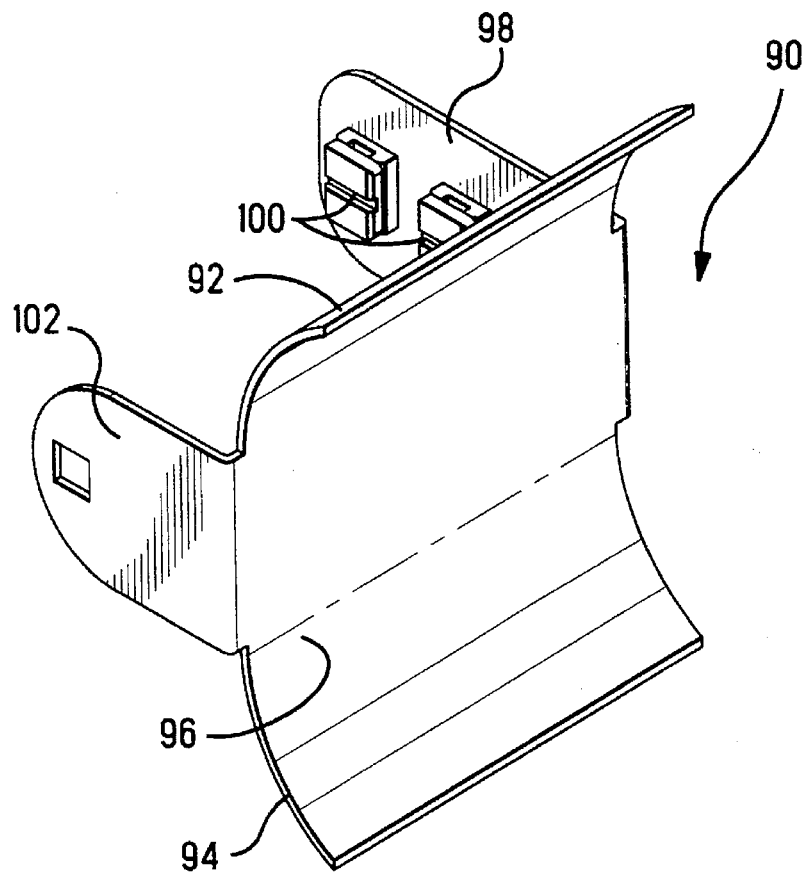
FIGS. 4 and 5 are isometric views another type of radius limiter bracket and a rack portion illustrating its use with representative cables.

In FIG. 4 is shown another type of radius limiter bracket 90 having a pair of arcuate cable support surfaces 92,94 with a planar bracket section 96 extending therebetween and that is tangential thereto. Similarly to radius limiter bracket 70, bracket 90 includes a mounting section 98 having fastener locations for two fasteners 100, and also preferably including a cable retaining section 102.

With reference to FIG. 5, radius limiter bracket 90 may be utilized when it is desired at a selected location on either an end frame member 14 or intermediate frame member 16 to provide for jumper cables 104 to extend from one enclosure 22 to an adjacent enclosure in the stack, thus requiring a cable or bundle thereof to extend about a bend of 180°, and each arcuate cable support surface 92,94 may be 90° or less.

With reference again to FIG. 1, another type of bracket 110 is seen mounted to mounting surface 32 of intermediate frame member 16 between the columnar arrays of fastening sites 34. Relay bracket 110 provides a continuous cable support surface 112 oval in shape, around which may be looped coils 114 of excess length of fiber optic cable 116 that is utilized to extend from stack to stack of the enclosures 22, such as for jumping or interconnecting selected connector sites of the enclosures. Semicylindrical cable support surfaces 118 at ends of the oval shape maintain a desired minimum radius for the optical fibers of cables 116. Relay bracket 110 is also seen to have mounting flanges 120 extending parallel to mounting surface 32 of intermediate frame member 16 and include apertures 122 enabling mounting thereto of rack cover panel members similar to rack cover panel 18 for enclosing the rack between the enclosure stacks. Also seen are cable retainer sections 124 at the ends of the oval.

Orthogonal brackets 40 and relay brackets 110 may be affixed to the frame members more or less permanently such as by screws or bolts or rivets (not shown) and may be made from rugged, durable material such as 14-gauge aluminum. Radius limiter brackets 70,90 may be made from rugged, durable material such as 14-gauge aluminum. Frame members 14,16 are preferably made from rugged, durable material such as 14-gauge aluminum while rack cover panels may be made from 16-gauge aluminum. Fasteners 56,80,100 may all be alike and may be of a type permitting easy and quick mounting with conventional tools, or manually, for permitting assembly in the field at an interconnection bay, and preferably also permit easy and quick unmounting, facilitating rack cover panel removal and also removal or relocation of the radius limiter brackets.

One type of fastener especially suitable for use with the present invention is a quarter turn one-piece fastener sold by The Hartwell Corporation of Placentia, Calif. under the product identification NYLATCH, disclosed in U.S. Pat. No. 3,964,364. Fastener 56,80,100 is self-retainably mounted to a fastener site of either a cover panel 18 or a radius limiter bracket 70,90 such that a locking portion 130 extends through an aperture thereof to be inserted through a corresponding aperture of either the orthogonal bracket 40 or a frame member 14,16. An accessible actuator section 132 is tool-actuatable to be rotated through a quarter turn from a first or unlocked state to a second or locked state, camming the legs 134 of the locking section apart and thus expanding the locking section 130 to lock behind the periphery of the aperture of the bracket 40 or frame member 14,16 and securing the cover panel or radius limiter bracket thereto. Thereafter, the actuator section 132 is again tool-actuatable from the second or locked state to the first or unlocked state to facilitate removal of the cover panel or the radius limiter bracket.

It is seen that the present invention can utilize any number of intermediate frame members and associated rack cover panels, to define a cable management rack of any desired size, providing for the interconnection of any number of stacked enclosures that may be mountable to an enclosure rack portion of framework 12 between the vertical frame members. It may also be desirable to modify the vertical frame members of the present invention to be fastened directly to horizontal crosspieces and to the enclosures. Variations in the particular shapes of the brackets may be devised, or in the manner of fastening them to the framework. Other variations and modifications may occur that are within the spirit of the invention and the scope of the claims.

What is claimed is:

1. A cable management rack for enabling securing, supporting and routing of bundles of fiber optic cables therealong at an optical fiber interconnection bay containing a plurality of interconnection enclosures, comprising:

a framework including at least a pair of vertical frame members spaced apart and enabling support for affixing interconnection enclosures at respective sites in vertical stacks between each pair;

first brackets fastened at least to an outer vertical edge of each end one of said frame members spaced from a said enclosure stack along an inner vertical edge thereof, providing for securing thereto ones of said cables routed vertically along a said vertical edge;

at least second brackets securable to each said frame member adapted to support ones of said cables about turns from vertical to horizontal orientation for ends thereof to extend to a said enclosure for fiber optic interconnection, such that said turns maintain at least a minimum radius thus protecting optical fibers thereof; and each said frame member including a columnar array of fastening sites along each vertical edge adjacent a said enclosure stack enabling fastening thereto of at least one said second bracket at a selected said fastening site, said cable management rack thereby being modular.

2. The cable management rack as set forth in claim 1 wherein said framework includes at least one intermediate frame member located between a pair of end frame members and vertically between a pair of said enclosure stacks, and each said intermediate frame member including a columnar array of fastening sites along each vertical edge thereof adjacent respective enclosure sites of said enclosure stacks.

3. The cable management rack as set forth in claim 2 wherein said first brackets and said at least second brackets include cable-retaining flanges at ends thereof spaced from said mounting surfaces of said frame members upon said first and second brackets being mounted to said frame members.

4. The cable management rack as set forth in claim 2 further including relay brackets affixed to said intermediate frame members between said columnar arrays of fastening sites, each said relay bracket providing an oval cable support surface for storing loops of excess lengths of cable therearound.

5. The cable management rack as set forth in claim 2 further including rack cover panels removably affixable to said framework outwardly of said fiber optic cables.

6. The cable management rack as set forth in claim 5 wherein each said fastener is of the type self-retaining to a said rack cover panel and includes a locking portion extending to be received into an aperture of said framework, and is of the type actuatable between a first state permitting insertion through a said aperture of said framework, and a second state locking to said framework to secure said rack cover member to said framework, enabling quick and simple rack cover panel mounting and unmounting.

7. The cable management rack as set forth in claim 5 wherein at least said first brackets include mounting flanges at forward ends thereof containing cover fastening sites of said framework.

8. The cable management rack as set forth in claim 7 wherein said first brackets include an array of openings through body sections thereof enabling fastening of cable ties thereto for securing said cables thereto.

9. The cable management rack as set forth in claim 5 wherein relay brackets are affixed to said intermediate frame members between said columnar arrays of fastener sites, each said relay bracket providing an oval cable support surface for storing loops of excess lengths of cable therearound, and said relay brackets include mounting flanges at forward ends thereof containing cover fastening sites.

10. The cable management rack as set forth in claim 2 wherein each said second bracket includes an arcuate cable support surface enabling selected said cables to be routed through a change of direction about a bend having a radius no less than a radius defined by said arcuate cable support surface, thereby protecting optical fibers of said cables.

11. The cable management rack as set forth in claim 10 wherein said arcuate cable support surface extends about an arcuate length up to 90° enabling a 90° change of direction for cables extending therearound.

12. The cable management rack as set forth in claim 10 wherein said arcuate cable support surface extends about an arcuate length up to 180° enabling a 180° change of direction for cables extending therearound.

13. The cable management rack as set forth in claim 12 wherein said arcuate cable support surface has two arcuate portions tangential to a common planar portion therebetween spacing said arcuate portions apart a selected distance.

14. The cable management rack as set forth in claim 10 wherein each said second bracket includes a frame mounting flange having two spaced fastener locations, and each said fastening site of a said frame member includes two correspondingly spaced fastener locations, whereby a pair of fasteners enable affixing said second bracket to said frame member in a manner preventing rotation of said second bracket.

15. The cable management rack as set forth in claim 14 wherein said spaced fastener locations and said correspondingly spaced fastener locations are apertures, and said fasteners extend through aligned ones of said apertures of said spaced locations and correspondingly spaced locations.

16. The cable management rack as set forth in claim 15 wherein each said fastener is of the type self-retaining to said frame mounting flange of said second bracket.

17. The cable management rack as set forth in claim 16 wherein each said fastener is of the type actuatable upon mounting said second bracket to a said frame member between a first state permitting insertion of a locking section thereof through a said aperture of said correspondingly spaced location, and a second state locking to said frame member to secure said second bracket to said frame member, enabling quick and simple bracket mounting and unmounting.

* * * * *